United States Patent
Ogawa (10) Patent No.: US 10,556,782 B2
(45) Date of Patent: Feb. 11, 2020

(54) RAISING/LOWERING CONVEYANCE DEVICE FOR CONTAINER FOR CONVEYING ARTICLE

(71) Applicant: Daifuku Co., Ltd., Osaka (JP)

(72) Inventor: Kazuki Ogawa, Shiga (JP)

(73) Assignee: Daifuku Co., Ltd. (JP)

( * ) Notice: Subject to any disclaimer, the term of this patent is extended or adjusted under 35 U.S.C. 154(b) by 162 days.

(21) Appl. No.: 15/896,705

(22) Filed: Feb. 14, 2018

(65) Prior Publication Data
US 2018/0170731 A1 Jun. 21, 2018

Related U.S. Application Data

(63) Continuation of application No. PCT/JP2016/074179, filed on Aug. 19, 2016.

(30) Foreign Application Priority Data

Aug. 24, 2015 (JP) .................... 2015-164371

(51) Int. Cl.
*B66F 9/18* (2006.01)
*B65G 47/90* (2006.01)
*B66C 1/30* (2006.01)

(52) U.S. Cl.
CPC .......... *B66F 9/186* (2013.01); *B65G 47/901* (2013.01); *B66C 1/30* (2013.01); *Y10S 294/902* (2013.01)

(58) Field of Classification Search
CPC ............... B25J 17/0208; B25J 19/0016; B25J 19/0091; B65G 47/901; B66C 1/30;
(Continued)

(56) References Cited

U.S. PATENT DOCUMENTS 2,771,204 A * 11/1956 McCormick ............ B66F 9/188
414/623
2,989,201 A * 6/1961 Hansen ................... B66F 9/188
414/623
(Continued)

FOREIGN PATENT DOCUMENTS

JP H06115608 A 4/1994
JP 2016003069 A 1/2016

*Primary Examiner* — James Keenan
(74) *Attorney, Agent, or Firm* — St. Onge Steward Johnston & Reens LLC (57) ABSTRACT

A raising/lowering conveyance device for a container for conveying an article includes a container gripping mechanism having multiple container support pins which are arranged so as to be capable of freely protruding and retracting. A spring for biasing the container gripping mechanism upward is interposed between the container gripping mechanism and a columnar support member for supporting the container gripping mechanism such that the container gripping mechanism can be freely raised and lowered. As a result of the upward biasing force of the spring, the container gripping mechanism is held at an equilibrium height in equilibrium with the weight thereof and is capable of movement vertically with the equilibrium height serving as the center of the movement. When the container gripping mechanism lifts a container, the mechanism receives the weight of the container, descends from the equilibrium height, and is supported at the fixed height of the columnar support member.

4 Claims, 8 Drawing Sheets

(58) Field of Classification Search
CPC ..... B66C 1/32; B66C 1/42; B66C 1/44; B66F 9/183; B66F 9/186; B66F 9/188; Y10S 901/45
USPC .................................. 294/86.4, 902; 901/45
See application file for complete search history.

(56) References Cited

U.S. PATENT DOCUMENTS

| | | | | |
|---|---|---|---|---|
| 2,998,892 | A * | 9/1961 | Menzel | B66F 9/183 414/623 |
| 4,572,564 | A * | 2/1986 | Cipolla | B25B 1/2421 269/266 |
| 5,118,154 | A * | 6/1992 | Assalita | B25J 15/02 294/86.4 |
| 5,403,057 | A * | 4/1995 | Sugito | B25B 1/2421 269/266 |
| 7,513,546 | B2 * | 4/2009 | Vranish | B25J 15/106 269/266 |
| 8,534,728 | B1 * | 9/2013 | Bosscher | B25J 15/10 294/86.4 |
| 8,651,543 | B2 * | 2/2014 | Matsuoka | B25J 15/0023 294/192 |
| 9,938,090 | B2 * | 4/2018 | Kyotani | B66C 1/10 |
| 10,040,643 | B2 * | 8/2018 | Kyotani | B66C 1/10 |
| 10,053,301 | B2 * | 8/2018 | Kyotani | B66C 1/10 |
| 10,053,302 | B2 * | 8/2018 | Kyotani | B66C 1/10 |
| 10,053,339 | B2 * | 8/2018 | Kyotani | B66C 1/42 |
| 10,233,039 | B2 * | 3/2019 | Miyoshi | B65G 1/04 |
| 2016/0001992 | A1 * | 1/2016 | Takao | B65G 47/90 414/788.4 |

\* cited by examiner

RAISING/LOWERING CONVEYANCE DEVICE FOR CONTAINER FOR CONVEYING ARTICLE

TECHNICAL FIELD

The present invention relates to a raising/lowering conveyance device for a container for conveying an article which includes at least two sets of container gripping means that grip, from both sides, the container for conveying an article so as to raise and lower the container.

BACKGROUND ART

As this type of raising/lowering conveyance device for a container for conveying an article, a device has been known in which, in a case where the container for conveying an article to be handled is a large container with an open/close door provided on its front side, as described in Japanese Published Unexamined Patent Application No. H6-115608 (Patent Literature 1), a raising/lowering member suspended from a ceiling traveling crane type traveling body so as to be freely raised and lowered is provided, and in which a fitting to be engaged provided on the ceiling surface of the large container or a hook freely attachable and detachable with respect to a gap below the bottom surface of the large container is provided on the lower side of the raising/lowering member so that the large container can be suspended on the lower side of the raising/lowering member. On the other hand, the present applicant has previously filed a raising/lowering conveyance device for a container for conveying an article which is suitable for a case of conveying a plastic small container with an upper side opened that can be conveyed while lifted and carried with both hands (Japanese Published Unexamined Patent Application No. 2016-3069). The raising/lowering conveyance device for a container for conveying an article according to this previous patent application includes at least two sets of container gripping means which are capable of freely moving closer to and away from the container for conveying an article in a horizontal direction and which are freely raised and lowered. The container gripping means have a configuration in which, on a side where the container is present, multiple container support pins are arranged so as to be capable of freely protruding and retracting in the horizontal direction and are biased and held in a protrusion position. The raising/lowering conveyance device for a container for conveying an article is configured such that the container gripping means, by the container support pins entering the lower side of an overhanging rib overhung horizontally outward from the outside surface of the container by movement toward the container, the container is supported.

In the raising/lowering conveyance device for a container for conveying an article according to the previous patent application described above, a fixed height of a columnar support member which supports a container gripping means so as to raise and lower the container gripping means is assumed to be a lower limit position, the container gripping means is supported to the columnar support member so as to be freely raised and lowered, in a state where the container gripping means is supported with respect to the columnar support member at the lower limit height, the container gripped by the container gripping means is conveyed to an area directly above an intended position, then, when the columnar support member is lowered to lower the gripped container to the intended position, the columnar support member is lowered by a fixed height, for example, about 5 to 10 mm in addition to the intended container lowering height, and the container gripping means supported at the lower limit height on the columnar support member is thereby brought into a vertically free state. The container is thereby reliably lowered on the floor surface of a storage area or the bottom portion of the container to be lowered is reliably fitted into an opening portion of a container previously placed on the floor surface of the storage area so as to lower the container.

SUMMARY OF INVENTION

However, in the configuration described above, when, in order for the container to be conveyed to be gripped by the container gripping means, the container support pins of the container gripping means are made to enter the lower side of the overhanging rib of the container, and the container support pins entering the upper side of the overhanging rib are in a state where the pins are pushed up by the overhanging rib, the weight of the entire container gripping means acts as a load on the container support pins riding on the overhanging rib. By contrast, when the container support pins entering directly below the overhanging rib are in a state where the pins are pushed down by the overhanging rib, the weight of the container side acts as a load on the container support pins entering the lower side of the overhanging rib. In either case, a significantly large frictional resistance is exerted between the overhanging rib and the container support pins which make slidable contact with any one of the upper and lower surfaces thereof, and thus the container support pins are brought into a state where the pins are prevented from being lightly and smoothly removed and fitted. In particular, when, after the transfer of the container, the container support pins of the container gripping means are pulled out from the overhanging rib of the container laterally outward, due to the fact that the frictional resistance therebetween is large, there is a possibility that the container is caught laterally outward and the position is displaced.

The present invention proposes a raising/lowering conveyance device for a container for conveying an article which can solve the conventional problems described above, and in order to easily understand a relationship with an embodiment which will be described later, reference signs used in the description of the embodiment are shown in parentheses. A raising/lowering conveyance device for a container for conveying an article includes at least two sets of container gripping means (2A, 2B) which are capable of freely moving closer to and away from the container for conveying an article (1) in a horizontal direction and which are freely raised and lowered. The raising/lowering conveyance device for a container for conveying an article is configured such that the container gripping means (2A, 2B) have a pinholder-shaped structure in which multiple container support pins (15) that are capable of freely protruding and retracting in the horizontal direction on the side of the container (1) and that are biased and held in a protrusion position are arranged, the container (1) is supported by the container support pins (15) which enter, by movement toward the container (1), the lower side of a downward facing step surface (the lower surface of an overhanging rib (1a)) formed outside the container (1), it is configured such that, the container gripping means (2A, 2B) are supported to columnar support members (6a, 6b) for raising and lowering the container gripping means (2A, 2B) so as to be freely raised and lowered, between the columnar support members (6a, 6b) and the container gripping means (2A, 2B), an elastic material (although the elastic material is a compression coil spring (20) in the embodiment, a tension coil spring or a rubber material in place of these springs can also be used) for biasing the container gripping means (2A, 2B) in a raising direction is interposed, the container gripping means (2A, 2B) are held, by an upward biasing force of the elastic material, at an equilibrium height (H3) in equilibrium with the weight of the container gripping means (2A, 2B) so as to be able to be moved vertically with the equilibrium height (H3) serving as the center of the movement, and when the container gripping means (2A, 2B) lift the container (1), the container gripping means (2A, 2B) which received the weight of the container (1) and lowered from the equilibrium height (H3) are supported at a fixed height of the columnar support members (6a, 6b).

According to the configuration of the present invention described above, the container gripping means which is not in the state of supporting the container are held by the elastic material at the equilibrium height in an unstable state in the up/down direction. That is, since the container gripping means is in a state where the weight thereof is cancelled out, even with a small external force, it is possible to easily move the container gripping means vertically. In addition, in a state where the container gripping means support the container, the container gripping means which received the weight of the container and lowered to the height lower than the equilibrium height is supported at the fixed height of the columnar support members. Therefore, in an operation step of receiving the container to be conveyed by the container gripping means, the empty container gripping means held at the equilibrium height are lowered to a predetermined height beside the container to be conveyed together with the columnar support members, and are then moved close to the container to be conveyed together with the columnar support members. At this time, even in a case where, among the multiple container support pins included in the container gripping means, a vertical pressing pin is present which is located at such a height as to ride on the upper surface of the container to be conveyed or to be pushed down by a downward facing step surface of the container to be conveyed, the container gripping means at this time is in a state where the weight thereof is cancelled out by the biasing force of the elastic material. Therefore, according to an upward or downward force received by the vertical pressing pin from the upper surface or the downward facing step surface of the container, the container gripping means themselves are lightly and easily moved vertically, and therefore the vertical pressing pin can ride on the upper surface of the container with a small frictional resistance or can enter below the downward facing step surface of the container with a small frictional resistance.

In an operation step of lowering the container to be conveyed to an intended position by the container gripping means, the container gripping means which received the weight of the container and lowered to the height lower than the equilibrium height is supported at the fixed height of the columnar support members, therefore, as in the conventional one, it is possible to convey the container in a stable state. However, as described previously, in a case where, an operation is performed in which, in addition to the height at which the container to be conveyed is estimated to have reached the intended lowering height, the container gripping means are further lowered together with the columnar support members by the fixed height so as to reliably lower the container to be conveyed at a predetermined height, after the container to be conveyed is lowered at the predetermined position, the weight of the container to be conveyed no longer acts on the container gripping means, and simultaneously, the container gripping means receives the upward biasing force of the elastic material. Therefore, the container support pin which is located directly above the downward facing step surface of the container to be conveyed is not, unlike the conventional one, strongly pressed downward against the upper surface of the container to be conveyed, but the container support pin which is located directly below the downward facing step surface of the container to be conveyed, that is, the pin which supported the container to be conveyed at the time of conveyance is naturally moved upward to such a height as to abut against the step surface by the biasing force of the elastic material together with the container gripping means.

Therefore, even when the operation is performed in which, in addition to the height at which the container to be conveyed is estimated to have reached the intended lowering height, the container gripping means are further lowered together with the columnar support members by the fixed height, there does not occur a phenomenon in which the container support pin is strongly pressed against the upper surface of the container to be conveyed. As a matter of course, in the retraction movement of the container gripping means after the container is lowered at the predetermined position, that is, in the operation of pulling out the container support pin laterally outward, even if a container support pin is present which abuts against the upper surface or the downward facing step surface of the container, since the vertical pressing force acting between the pin and the surface on the side of the container is a force caused by the biasing force of the elastic material for cancelling out the weight of the container gripping means, the frictional force acting between both of them is significantly small, the lowered container is therefore prevented from being dragged laterally as the container support pin is pulled out.

In a case where the present invention is implemented, it is also possible to interpose the elastic material for lifting the container gripping means between the container gripping means and the columnar support members so as to make the container gripping means held at the equilibrium height in equilibrium with the weight thereof. In this case, stoppers which receive, when the container gripping means support the container to be conveyed, the container gripping means lowered from the equilibrium height at the predetermined height are required to be provided on the side of the columnar support members. However, preferably, in the columnar support members (6a, 6b), spring bearing members (18) are provided in a position below the container gripping means (2A, 2B), and on the spring bearing members (18), as the elastic material, a plurality of compression coil springs (20) for supporting the container gripping means (2A, 2B) at upper ends thereof are attached. According to this configuration, it is possible to enhance the stability of the container gripping means at the equilibrium height.

In a case where the container gripping means are supported by the compression coil springs as described above, the container gripping means which support and lower the container to be conveyed can also be supported by the upper ends of the compression coil springs that received the weight of the container and is compressed to a compression limit. However, preferably, stoppers (21a, 21b) are separately provided which receive, in a position higher than the height of the upper ends at the time of maximum compression of the compression coil springs (20), the container gripping means (2A, 2B) that are lowered from the equilibrium height (H3). According to this configuration, it is possible to enhance the durability of the compression coil springs used, to enhance the accuracy of the lowering limit height of the container gripping means which supported the container to be conveyed, and to stably support the container gripping means. Furthermore, although the compression coil spring which is cylindrical with the same diameter from the lower end to the upper end may be used, the compression coil spring is preferably used which is formed in the shape of a cone in which the upper end for supporting the container gripping means (2A, 2B) has the minimum diameter. According to this configuration, the spring itself has the function of automatically aligning the upper end (the upper end having the minimum diameter), it is therefore possible to make the raising/lowering movement of the container gripping means (2A, 2B) with respect to the columnar support members (6a, 6b) smoothly performed. Moreover, as compared with the cylindrical compression coil spring, it is also possible to significantly decrease the minimum length at the compression limit with respect to the maximum length at the time of no load, it is therefore possible to easily increase the amount of lowering of the container gripping means from the equilibrium height.

DESCRIPTION OF EMBODIMENTS

Figure 1:
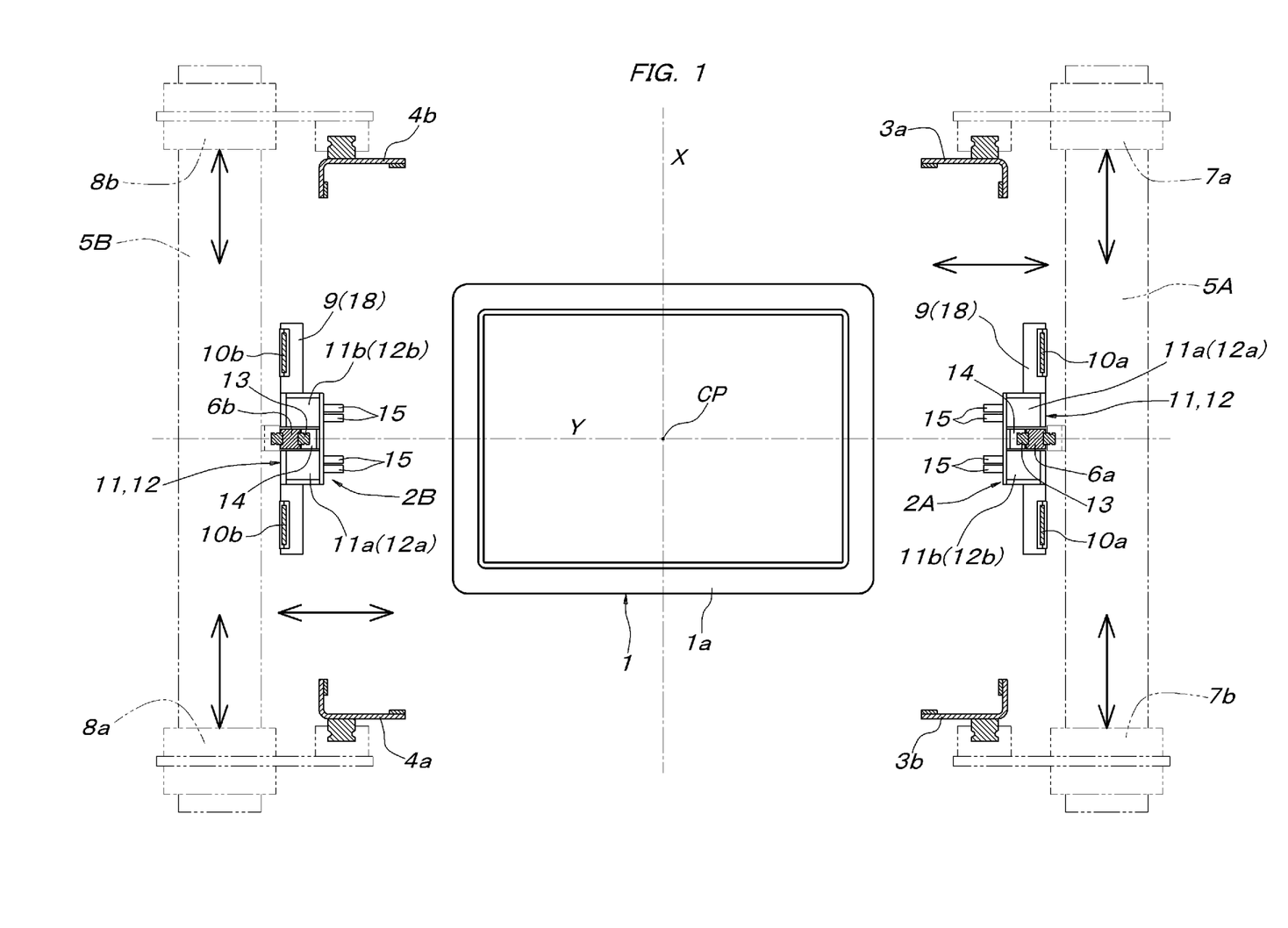
FIG. 1 is a plan view showing a gripping device which is in an open state with respect to a container to be conveyed.
Figure 2:
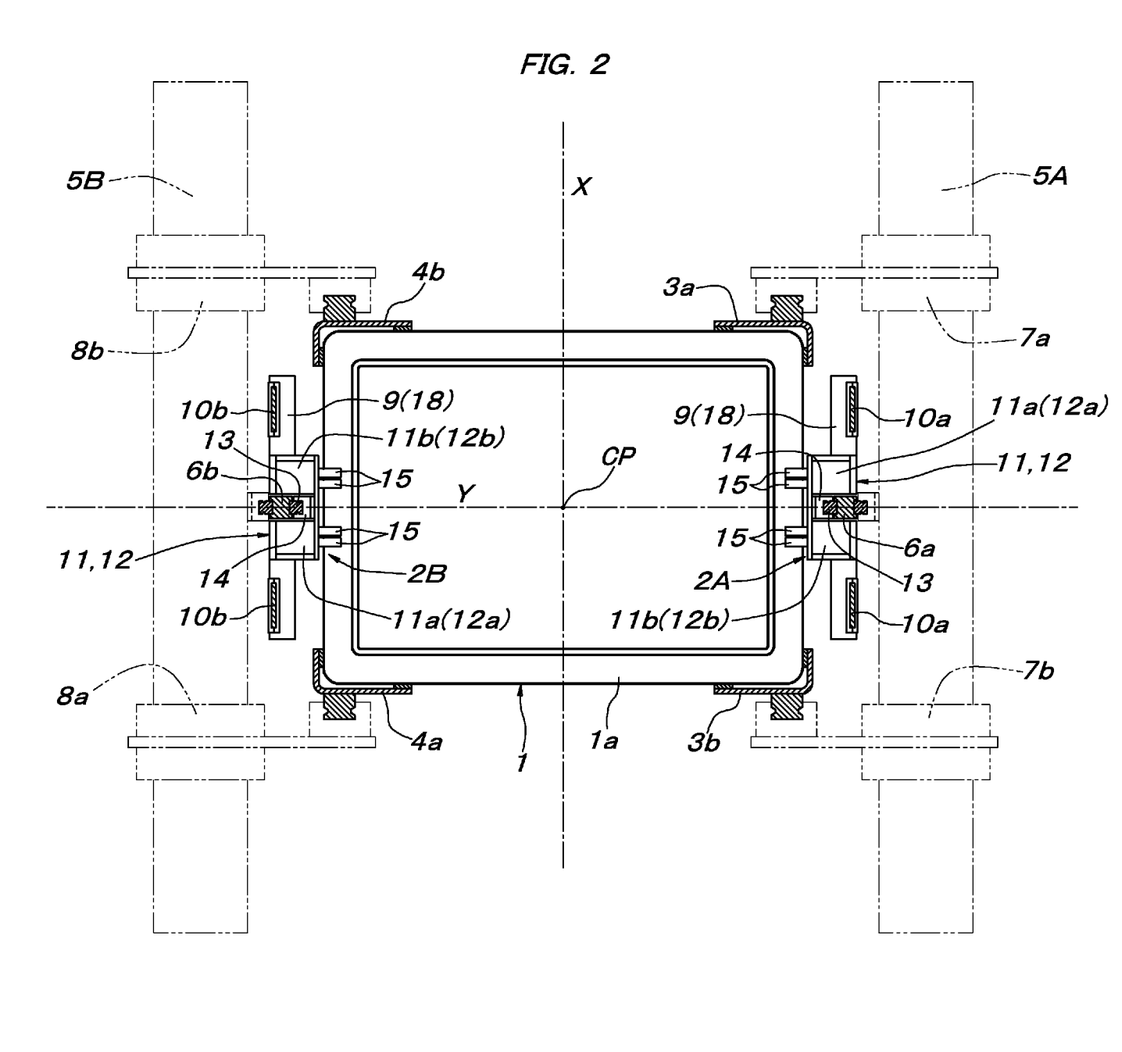
FIG. 2 is a plan view showing the gripping device which is in a closed state with respect to the container to be conveyed.
Figure 3:
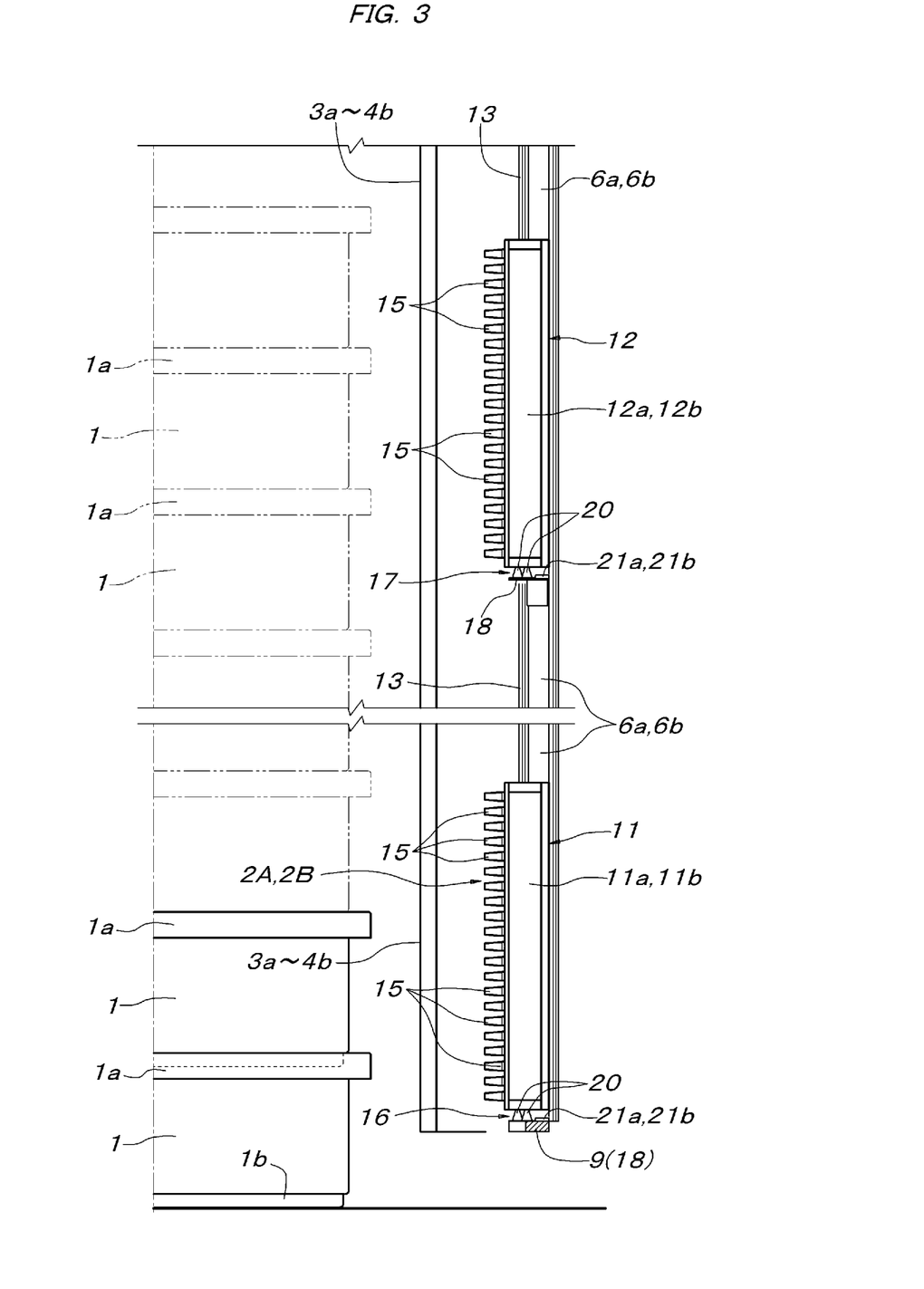
FIG. 3 is a side view showing a main portion of the gripping device including upper/lower two-stacked container gripping means.

A raising/lowering conveyance device for a container for conveying an article according to the present embodiment shown in attached figures has the same basic structure as that shown in the description and drawings of the previously described previous patent application invention (the invention disclosed in Japanese Published Unexamined Patent Application No. 2016-3069), as shown in FIGS. 1 to 3, the device lifts and conveys a plastic container for conveying an article which is small enough to be able to be lifted and carried with both hands, and which can be stacked (hereinafter referred to as a container in short) 1. The raising/lowering conveyance device includes a pair of container gripping means 2A and 2B which grip both sides of the container 1 placed in a center position CP parallel to a horizontally vertical direction imaginary line X of the horizontally vertical direction imaginary line X and a horizontally lateral direction imaginary line Y which pass through the center position CP in the plan view of the raising/lowering conveyance device and which are perpendicular to each other, and four positioning members 3a to 4b which are fitted to the four corners of the container 1 for positioning. A description will be given below with the assumption that a direction parallel to the horizontally vertical direction imaginary line X is a horizontally vertical direction and that a direction parallel to the horizontally lateral direction imaginary line Y is a horizontally lateral direction.

Above the horizontally lateral direction pair of container gripping means 2A and 2B, laterally moving bases 5A and 5B are provided which are formed with horizontal members that are long in the horizontally vertical direction and which are capable of freely moving closer to and away from each other in the horizontally lateral direction while keeping symmetrical positions with respect to the horizontally vertical direction imaginary line X. To the inner sides of the centers of the laterally moving bases 5A and 5B intersecting the horizontally lateral direction imaginary line Y, columnar support members 6a and 6b are attached so as to be freely raised and lowered. The container gripping means 2A and 2B are attached to the inner sides of the respective columnar support members 6a and 6b at the same height. Movable bases 7a to 8b are supported to both end portions of the respective laterally moving bases 5A and 5B in the length direction thereof so as to be capable of freely moving closer to and away from each other in the horizontally vertical direction while keeping symmetrical positions with respect to the horizontally lateral direction imaginary line Y, and the respective positioning members 3a to 4b are supported to the respective movable bases 7a to 8b so as to be freely raised and lowered. Each of the positioning members 3a to 4b is formed with a mold member whose transverse section is formed in the shape of the letter L in a direction which is able to be fitted to the four corners of the container 1 and which is long in a vertical up/down direction.

According to the configuration described above, by moving both the laterally moving bases 5A and 5B close to each other in the horizontally lateral direction, and simultaneously moving the respective movable bases 7a, 7b, 8a, and 8b close to each other in the horizontally vertical direction with respect to the respective laterally moving bases 5A and 5B, as shown in FIG. 2, the center portions of both the sides of the container 1 in the horizontally lateral direction can be gripped by the horizontally lateral direction pair of container gripping means 2A and 2B, and simultaneously, the respective positioning members 3a to 4b can be fitted to the four corners of the container 1. Both the laterally moving bases 5A and 5B are supported at a fixed height above the floor surface of a container storage area on a conveyance carriage capable of traveling in the horizontally vertical direction and the horizontally lateral direction, and the columnar support members 6a and 6b to which the container gripping means 2A and 2B are respectively attached are individually driven via two raising/lowering driving flat belts 10a and 10b with respect to the respective laterally moving bases 5A and 5B. The lower ends of these respective two raising/lowering driving flat belts 10a and 10b are coupled to both end portions of horizontal members 9 which are attached to the lower ends of the columnar support members 6a and 6b so as to be overhung to both sides in the horizontally vertical direction. The positioning members 3a and 3b perform raising/lowering movement with respect to the respective movable bases 7a and 7b in synchronization with the raising/lowering movement of the columnar support member 6a located in the intermediate position thereof, and the positioning members 4a and 4b perform raising/lowering movement with respect to the respective movable bases 8a and 8b in synchronization with the raising/lowering movement of the columnar support member 6b located in the intermediate position thereof.

The horizontally lateral direction pair of container gripping means 2A and 2B include lower single members 11 which are attached to the lower end portions of the columnar support members 6a and 6b, and upper single members 12 which are attached to the columnar support members 6a and 6b at positions upward away from the lower single members 11 by an appropriate distance, and the respective single members 11 and 12 have the same structure and include, as shown in FIGS. 1 and 2, parallel casings 11a to 12b which are arranged on both sides of the columnar support members 6a and 6b and which are vertically long. Between the parallel casings 11a and 11b and between the parallel casings 12a and 12b, a pair of upper and lower guide blocks 14 are fitted which are attached to raising/lowering guide rails 13 provided on the inner sides of the columnar support members 6a and 6b so as to be freely raised and lowered, and the lower single members 11 and the upper single members 12 are thereby freely raised and lowered with respect to the columnar support members 6a and 6b. Container support pins 15 are individually supported to the casings 11a to 12b in plan view in symmetrical positions with respect to the horizontally lateral direction imaginary line Y in two rows vertically.

Figure 4A:
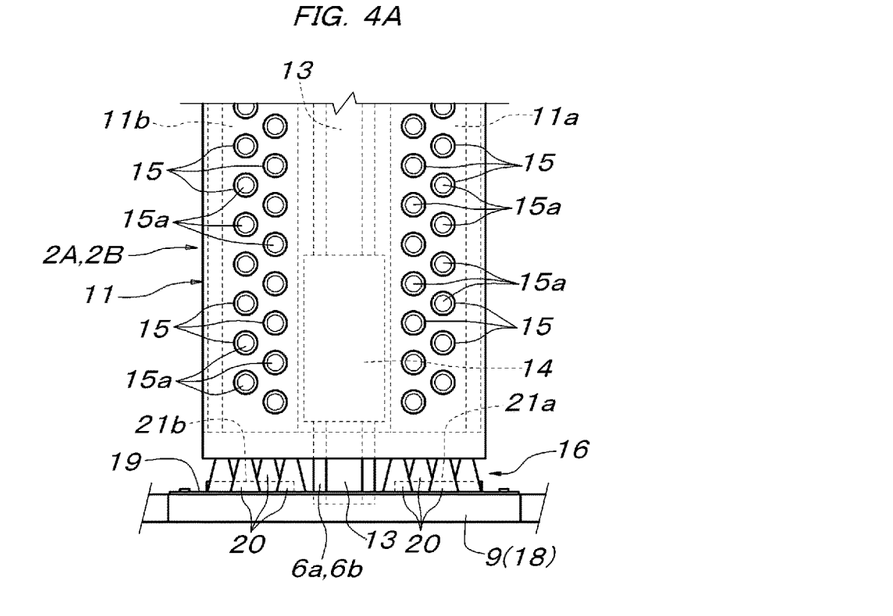
FIG. 4A is a front view of a main portion showing the lower container gripping means.
Figure 4B:
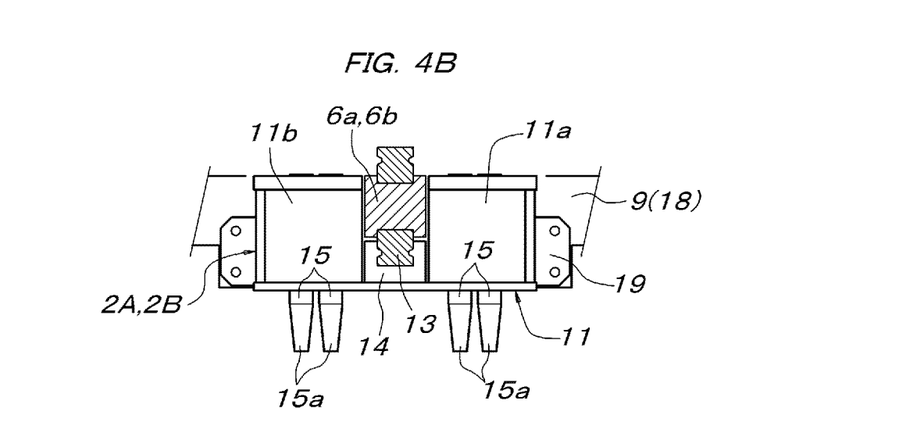
FIG. 4B is a transverse sectional plan view in a position directly above the lower container gripping means.
Figure 5A:
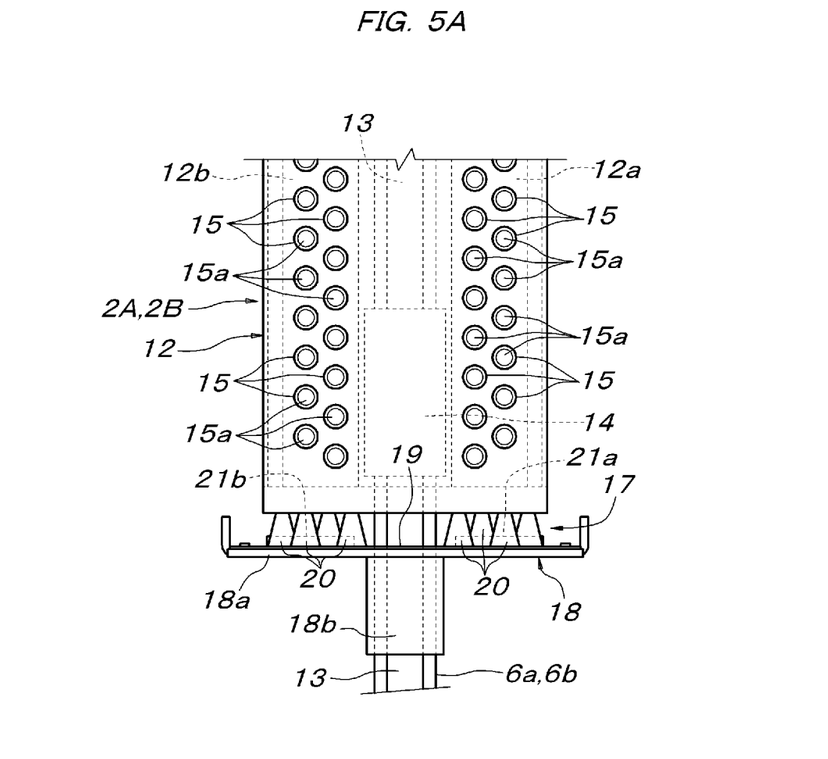
FIG. 5A is a front view of a main portion showing the upper container gripping means.
Figure 7A:
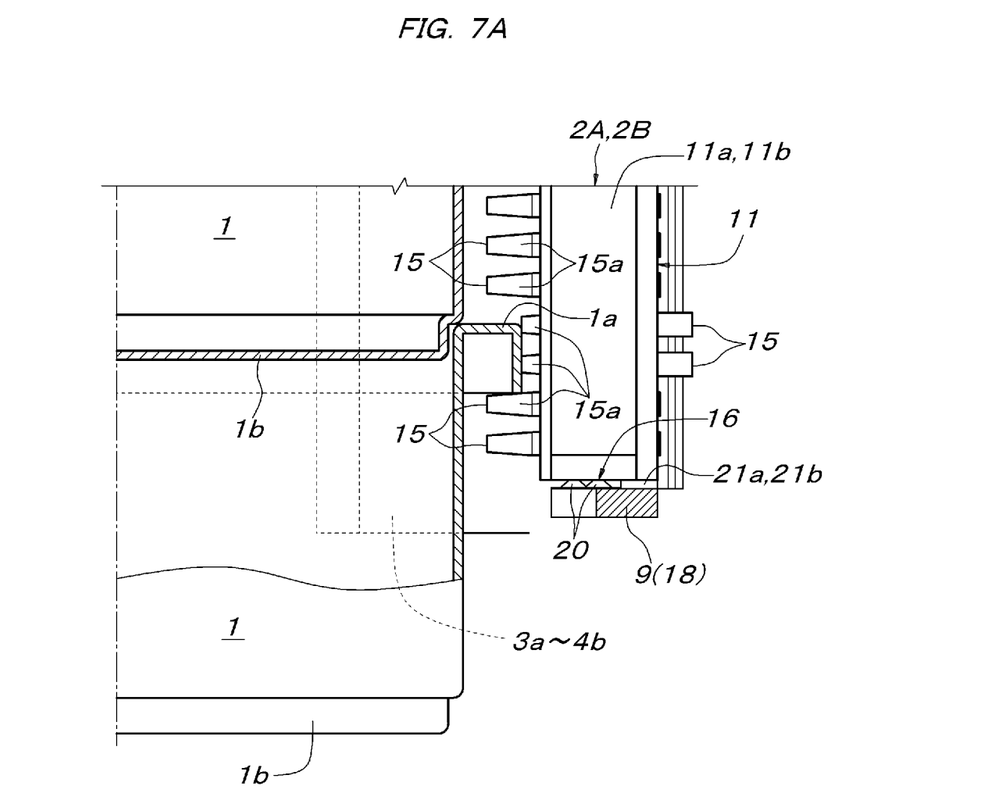
FIG. 7A is a longitudinal sectional side view of a main portion showing a state where the container gripping means lifts the container.
Figure 7B:
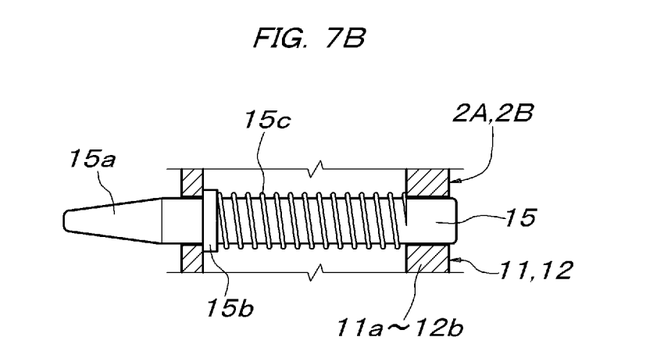
FIG. 7B is an enlarged longitudinal sectional side view of a main portion showing the internal structure of the container gripping means.

These container support pins 15 are arranged, as shown in FIGS. 4A and 5A, such that when seen from a front view from the side of the center position CP, two container support pins 15 of the same height with a narrow distance in the horizontally vertical direction and two container support pins 15 of the same height with a wide distance in the horizontally vertical direction are alternately located in the up/down direction an appropriate distance apart from each other. As shown in FIG. 7B, in each of the container support pins 15, a container support tip end portion 15a which is protruded from the casings 11a to 12b is processed so as to be tapered, the container support pin 15 includes a stopper 15b which abuts against the inner side of the front side wall plate of the casings 11a to 12b and the rear end thereof has such a length as to penetrate the rear side wall plate of the casings 11a to 12b. Each of the container support pins 15 is biased and held by a compression coil spring 15c loosely fitted to the container support pin 15 between the stopper 15b and the rear side wall plate of the casings 11a to 12b into a state where the container support tip end portion 15a is protruded a predetermined length from the casings 11a to 12b.

Figure 4C:
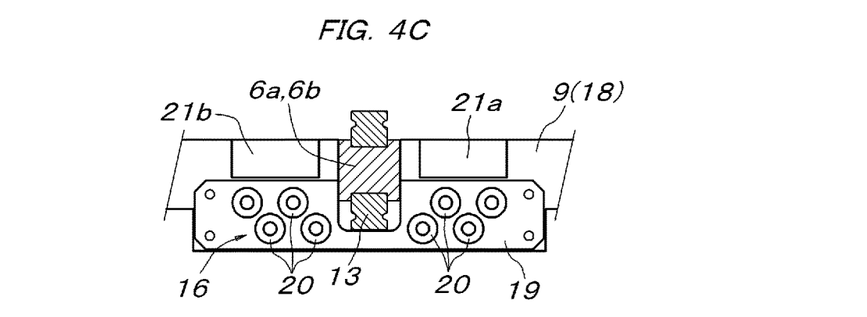
FIG. 4C is a transverse sectional plan view in a position directly below the lower container gripping means.
Figure 5B:
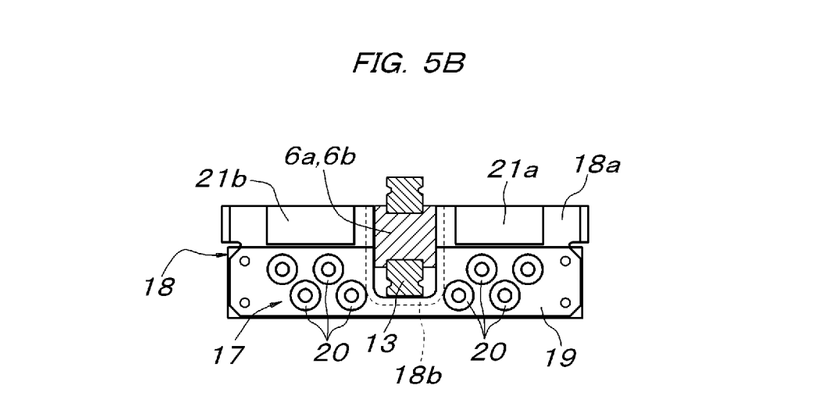
FIG. 5B is a transverse sectional plan view in a position directly below the upper container gripping means.

As shown in FIGS. 3 to 5B, in the lower single members 11 and the upper single members 12 of the container gripping means 2A and 2B configured as described above, the lower ends thereof are supported via support means 16 and 17 to the columnar support members 6a and 6b. The respective upper and lower support means 16 and 17 are formed with spring bearing members 18 which are attached to the columnar support members 6a and 6b, a plurality of compression coil springs 20 which are attached via spring attachment plates 19 onto the spring bearing members 18, and a horizontally vertical direction pair of stoppers 21a and 21b which are made of an elastic material. These stoppers 21a and 21b are separately attached, on the rear side of the spring attachment plate 19, on the spring bearing member 18, to both the sides of the columnar support members 6a and 6b in the horizontally vertical direction. As the spring bearing members 18 of the lower support means 16 for supporting the lower single members 11, the horizontal members 9 which are attached to the lower ends of the columnar support members 6a and 6b and to which the lower ends of the raising/lowering driving flat belts 10a and 10b are coupled are utilized as they are. As shown in FIGS. 5A and 5B, the spring bearing members 18 of the upper support means 17 for supporting the upper single members 12 are formed with horizontal plates 18a that have, in the center thereof, concave entrance portions into which the columnar support members 6a and 6b and the raising/lowering guide rails 13 on the inner sides thereof enter, and U-shaped plates 18b which are located on the lower sides of the horizontal plates 18a and whose upper end are fixed to the inner sides of the concave entrance portions. The U-shaped plates 18b are attached to the columnar support members 6a and 6b.

Figure 8A:
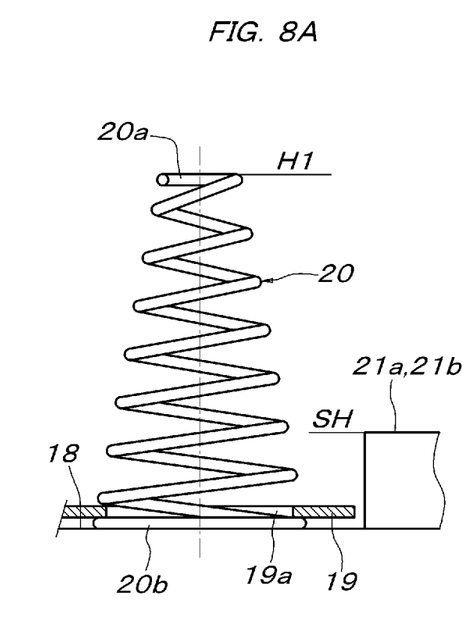
FIGS. 8A to 8C are partially longitudinal sectional side views of a main portion illustrating the detailed structure and the action of a spring supporting the container gripping means.
Figure 8B:
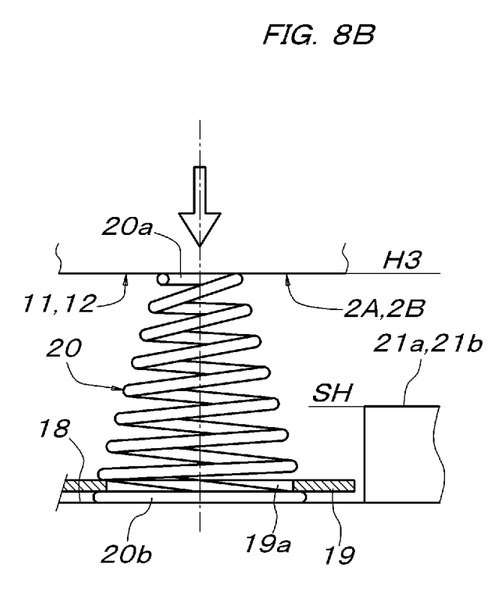
Figure 8C:
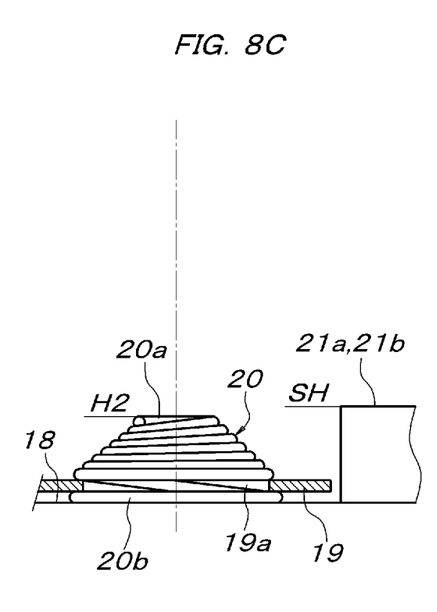

As shown in FIGS. 8A to 8C, the compression coil spring 20 in each of the support means 16 and 17 is formed in the shape of a cone in which an upper end ring portion 20a for receiving the bottom surface (the bottom surface of each of the casings 11a to 12b) of each of the upper and lower single members 11 and 12 has the minimum diameter. In the spring attachment plate 19, an attachment hole 19a is provided whose inside diameter is smaller than the outside diameter of a lower end ring portion 20b having the maximum diameter of the compression coil spring 20. In a state where the lower end ring portion 20b of the compression coil spring 20 is made to enter the lower side of the attachment hole 19a, the lower end ring portion 20b and the spring attachment plate 19 are fixed such as by spot welding, and a plurality of compression coil springs 20 are thereby attached onto the spring attachment plates 19 such that the compression coil springs 20 are appropriately aligned, for example, as shown in FIGS. 4C and 5B, four compression coil springs 20 are aligned so as to support each of the casings 11a to 12b. Then, the spring attachment plate 19 is placed on the spring bearing member 18 on the side of the columnar support members 6a and 6b, and in a state where the lower end ring portions 20b of the compression coil springs 20 are sandwiched between the spring attachment plate 19 and the spring bearing member 18, both ends of the spring attachment plate 19 are attached to the spring bearing member 18 with, for example, bolts and nuts.

The conical compression coil spring 20 in each of the support means 16 and 17 is deformed by receiving a compression force, from a maximum elongation height H1 in a no-load state shown in FIG. 8A to a height H2 at the time of maximum compression shown in FIG. 8C. When the compression coil spring 20 is at the height H2 at the time of maximum compression shown in FIG. 8C, it is in a state where a small-diameter ring portion on the upper side enters the inside of a large-diameter ring portion on the lower side such that they abut against each other, and the height of the compression coil spring 20 is therefore lower than a height obtained by adding the diameters of the wires by the number of stacks. As a matter of course, a conical compression coil spring can also be used in which a small-diameter ring portion on the upper side fully enters the inside of a large-diameter ring portion on the lower side such that the ring portions in all the stacks enter, in a spiral shape, the inside of one ring portion in contact with the upper surface of the spring attachment plate 19.

In any case, as shown in FIG. 8C, in the compression coil spring 20, the height H2 at the time of maximum compression is lower than the height SH of the stoppers 21a and 21b attached on the same spring bearing member 18, and the maximum elongation height H1 is sufficiently higher than the height SH of the stoppers 21a and 21b. When the respective upper and lower single members 11 and 12 of the container gripping means 2A and 2B in the no-load state where the container 1 is not gripped are supported by the respective support means 16 and 17, the individual compression coil springs 20 in each of the support means 16 and 17 are, as shown in FIG. 8B, compressed and deformed so as to have a height in equilibrium with the weight of each of the single members 11 and 12, with the result that the respective single members 11 and 12 are supported at an equilibrium height H3. The equilibrium height H3 at this time is higher than the height SH of the stoppers 21a and 21b. Furthermore, as will be described later, the size and strength of the compression coil springs 20 are set such that when the lower single members 11 or both the upper and lower single members 11 and 12 in the container gripping means 2A and 2B grip and lift the predetermined container 1 via the respective container support pins 15, the lower single members 11 or both the upper and lower single members 11 and 12 receive the weight of the container 1 and lower while compressing and deforming the compression coil springs 20 of the support means 16 and 17, and the single members 11 and 12 are received by the stoppers 21a and 21b made of the elastic material before the compression coil springs 20 reach the height H2 at the time of maximum compression.

As shown in FIGS. 1 to 3 and 7A, the container 1, which is handled in the raising/lowering conveyance device configured as described above, has a quadrangular planar shape, and the container 1 is formed in the shape of a box with its upper side opened, an overhanging rib 1a that is overhung outward for reinforcement and the formation of a handle is integrally formed around an opening portion and a protrusion base portion 1b that has such a size as to be able to fit the inside of an opening portion in another container 1 is integrally formed on the bottom portion. Therefore, in the container 1, the lower surface of the overhanging rib 1a serves as a downward facing step surface, and the upper surface of the overhanging rib 1a serves as the upper surface of the container 1. It is noted that the structure of the container 1 is not limited to the structure shown in the figures. For example, a container may be adopted in which near the upper end of a peripheral wall surface, a concave groove portion parallel to the peripheral direction is formed and in which the upper surface of the inside of the concave groove portion serves as a downward facing step surface.

Within the storage area of the container 1 where the raising/lowering conveyance device configured as described above is additionally provided, the containers 1 are arranged in a direction such that the four sides thereof are parallel to the horizontally vertical direction and the horizontally lateral direction. Then, in a case where a specific container 1 among them is conveyed from the position to another place, as shown in FIG. 1, the raising/lowering conveyance device is made to travel such that the center position CP of the raising/lowering conveyance device matches the center position of the container 1 to be conveyed in plan view, and is stopped in a position directly above the container 1 to be conveyed. Next, in a state where the container gripping means 2A and 2B and the respective positioning members 3a to 4b are located on the outside of the container 1 to be conveyed in plan view, the raising/lowering driving flat belts 10a and 10b are driven so as to lower the horizontally lateral direction pair of columnar support members 6a and 6b and the four positioning members 3a to 4b, and, as shown in FIG. 3, the lower single members 11 of the respective container gripping means 2A and 2B and the respective positioning members 3a to 4b are located directly beside the overhanging rib 1a of the container 1 to be conveyed (directly beside the overhanging rib 1a of the lowermost container 1 when, as shown in FIG. 3, a plurality of containers 1 stacked vertically are to be conveyed). At this time, there is a case where the container 1 to be conveyed is multiple containers stacked, and the container(s) 1 to be conveyed is located also on the inner side of the upper single members 12 in the container gripping means 2A and 2B.

Figure 6:
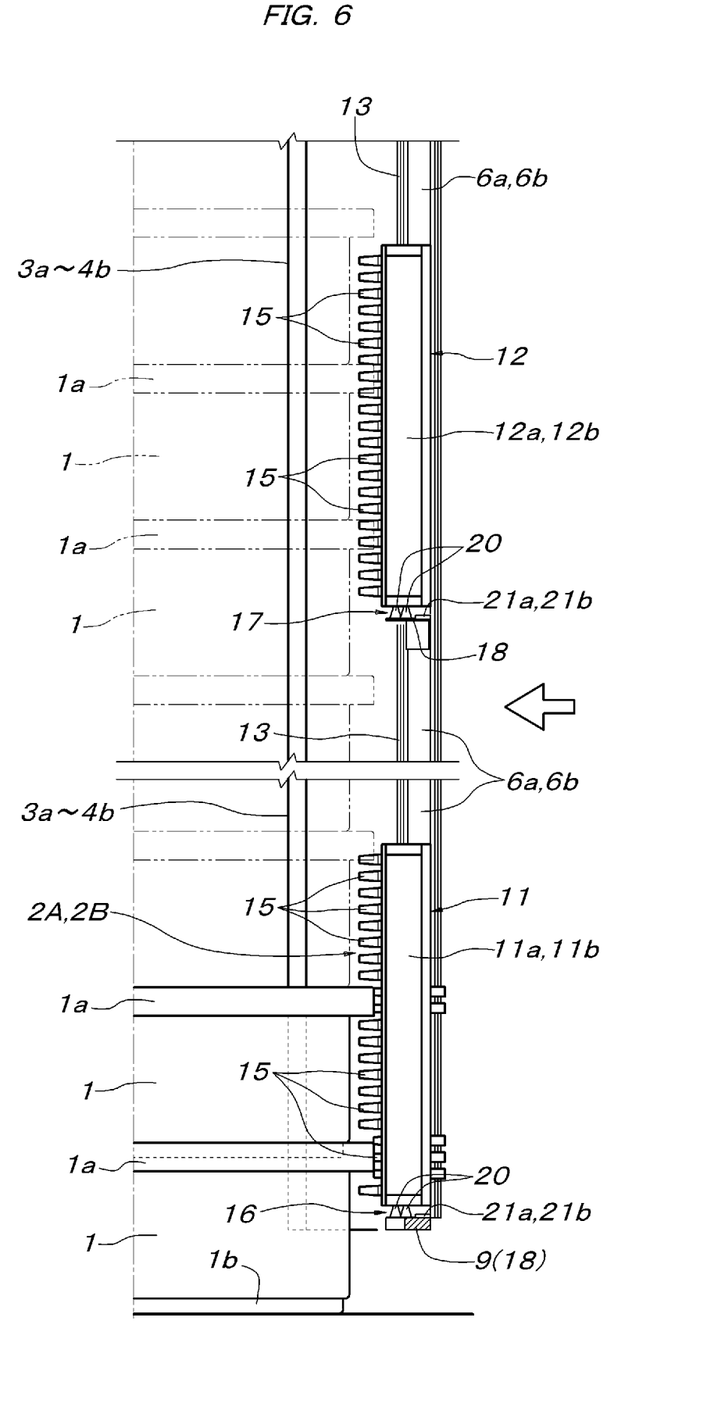
FIG. 6 is a side view of a main portion showing how the gripping device shown in FIG. 3 grips the container.

The container gripping means 2A and 2B and the respective positioning members 3a to 4b are lowered to the predetermined height as described above, then, the laterally moving bases 5A and 5B are moved close to each other in the horizontally lateral direction and the movable bases 7a to 8b on the respective laterally moving bases 5A and 5B are moved close to each other in the horizontally vertical direction, and thus, as shown in FIGS. 2 and 6, the respective positioning members 3a to 4b are fitted to the four corners of the container 1 to be conveyed, and simultaneously, the container 1 to be conveyed is sandwiched from both sides in the horizontally lateral direction by both the container gripping means 2A and 2B. Consequently, as shown in FIGS. 6 and 7A, among the container support pins 15 of both the upper and lower single members 11 and 12 in both the container gripping means 2A and 2B, the tip end of the container support pin 15 at a height facing the overhanging rib 1a of the container 1 to be conveyed abuts against the outside surface of the overhanging rib 1a so as to be prevented from being moved forward. Therefore, the container support pin 15 is relatively retracted into the casings 11a to 12b against the biasing force of the compression coil spring 15c, and only the other container support pins 15 are moved close to the outside surface of the container 1 to be conveyed while being held in the protrusion position by the biasing force of the compression coil spring 15c.

As described above, in the process in which the container 1 to be conveyed is sandwiched from both sides in the horizontally lateral direction by both the container gripping means 2A and 2B that are moved closer to each other in the horizontally lateral direction, it is highly likely that, among the container support pins 15 held in the position of the protrusion by the biasing force of the compression coil spring 15c, a container support pin 15 is present which is moved forward while pressing, in the up/down direction, to the upper surface or the lower surface of the overhanging rib 1a in the container 1 to be conveyed. On the other hand, the respective upper and lower single members 11 and 12 which support the container support pins 15 such that the container support pins 15 are capable of freely protruding and retracting are, as shown in FIG. 8B, supported by the compression coil springs 20 of the support means 16 and 17 at the equilibrium height H3 in equilibrium with the weight thereof and therefore are in a state where they are able to be moved loosely floating in the up/down direction.

Therefore, in a case where a specific container support pin 15 is present which is moved forward while pressing to the upper surface of the overhanging rib 1a in the container 1 to be conveyed, in combination with the fact that the container support tip end portion 15a of each of the container support pins 15 is formed in the shape of a tapered cone, while by a pressing reaction force in the up/down direction between the specific container support pin 15 and the upper surface of the overhanging rib 1a in the container 1 to be conveyed, the entire single members 11 and 12 having the specific container support pin 15 are being moved upward along the columnar support members 6a and 6b in the direction in which the upward biasing force of the compression coil springs 20 in the support means 16 and 17 act, the container support tip end portion 15a of the specific container support pin 15 rides on the upper surface of the overhanging rib 1a in the container 1 to be conveyed so as to be able to be reliably moved to a forward limit position. By contrast, even in a case where a specific container support pin 15 is present which is moved forward while pressing to the lower surface of the overhanging rib 1a in the container 1 to be conveyed, in combination with the fact that the container support tip end portion 15a of each of the container support pins 15 is formed in the shape of a tapered cone, while by a pressing reaction force in the up/down direction between the specific container support pin 15 and the lower surface of the overhanging rib 1a in the container 1 to be conveyed, the entire single members 11 and 12 having the specific container support pin 15 are being moved downward along the columnar support members 6a and 6b against the upward biasing force of the compression coil springs 20 in the support means 16 and 17, the container support tip end portion 15a of the specific container support pin 15 enters below the lower surface of the overhanging rib 1a in the container 1 to be conveyed so as to be able to be reliably moved to the forward limit position.

As described above, when, as shown in FIG. 6, the container 1 to be conveyed is sandwiched from both sides in the horizontally lateral direction by both the container gripping means 2A and 2B which are moved closer to each other in the horizontally lateral direction, the raising/lowering driving flat belts 10a and 10b are driven in the opposite direction, so as to raise the horizontally lateral direction pair of columnar support members 6a and 6b and the four positioning members 3a to 4b. Consequently, as shown in FIG. 7A, among the container support pins 15 of both the container gripping means 2A and 2B, the container support tip end portion 15a of an effective container support pin 15 which enters directly below the overhanging rib 1a of the container 1 to be conveyed lifts the container 1 to be conveyed. At this time, the weight of the container 1 to be conveyed acts, via the effective container support pins 15, downward on the single members 11 and 12 having the effective container support pins 15, and the single members 11 and 12 are therefore lowered while further compressing and deforming the compression coil springs 20 of the support means 16 and 17 from the equilibrium height H3 shown in FIG. 8B and are then received by the stoppers 21a and 21b. In other words, the weight of the container 1 to be conveyed is reliably received by the columnar support members 6a and 6b via the effective container support pins 15 of both the container gripping means 2A and 2B, the single members 11 and 12 having the effective container support pins 15, and the stoppers 21a and 21b made of the elastic material, and thus it is possible to stably lift the container 1 to be conveyed. Since in the lifting described above, the positioning members 3a to 4b are fitted to the four corners of the container 1 to be conveyed so as to position the container 1 to be conveyed, even a plurality of containers 1 stacked can be stably lifted and conveyed without swinging the containers 1.

When the container 1 which is lifted and conveyed by the raising/lowering conveyance device in this way is lowered to another place, it suffices that the raising/lowering conveyance device is operated in a procedure opposite to the operational procedure described above. However, in order for the transfer of the container 1 to be conveyed in the place of the lowering to be reliably performed, the lowering limit height of the container gripping means 2A and 2B and the positioning members 3a to 4b is not set to the height at which the bottom surface of the container 1 to be conveyed suspended by the container gripping means 2A and 2B via the effective container support pins 15 reaches the floor surface or to the height at which the protrusion base portion 1b is fitted into the opening portion at the tip end of another container 1 that has already been stored but is set to a height that is slightly lower than such height. In such a case, when the container 1 to be conveyed suspended via the effective container support pins 15 reaches the floor surface or when the protrusion base portion 1b is fitted into the opening portion at the tip end of another container 1 so as to be supported, the weight of the container 1 to be conveyed is received by the floor surface or another container therebelow, and thus the weight no longer acts on the effective container support pins 15. Consequently, the single members 11 and 12 having the effective container support pins 15 are brought into a state where they can be moved upward within a range from the lowering limit height at which the single members 11 and 12 are supported by the stoppers 21a and 21b to the height at which the compression coil springs 20 are returned to the equilibrium height H3 by receiving the upward biasing force of the compression coil springs 20 in the support means 16 and 17.

Therefore, after the weight of the container 1 to be conveyed is received by the floor surface or another container therebelow, the single members 11 and 12 of the container gripping means 2A and 2B are not lowered as the columnar support members 6a and 6b supporting the container gripping means 2A and 2B are lowered, but while the height is maintained at which the effective container support pins 15 receive the upward biasing force of the compression coil springs 20 in the support means 16 and 17 so as to abut against the lower surface of the overhanging rib 1a in the container 1 to be conveyed, only the columnar support members 6a and 6b are relatively lowered with respect to the container gripping means 2A and 2B until the compression coil springs 20 reach the equilibrium height H3. When the lowering of the columnar support members 6a and 6b is stopped in the process in which the compression coil springs 20 reach the equilibrium height H3, the effective container support pins 15 are in a state where they are kept abutting against the lower surface of the overhanging rib 1a in the container 1 to be conveyed, a pressing force therebetween at that time is, at the maximum, equivalent to a compression reaction force until the compression coil springs 20 reach the equilibrium height H3, i.e., small. In addition, when the lowering of the columnar support members 6a and 6b is stopped after the compression coil springs 20 reach the equilibrium height H3, the effective container support pins 15 are separated downward from the lower surface of the overhanging rib 1a in the container 1 to be conveyed, and the container support pins 15 located directly above the upper surface of the overhanging rib 1a are lowered so as to abut against the upper surface of the overhanging rib 1a in the container 1 to be conveyed. In this case as well, the pressing force is lower than the biasing force of the compression coil springs 20 in equilibrium with the weight of the single members 11 and 12, since the single members 11 and 12 are kept biased upward, the pressing force acting between the upper surface of the overhanging rib 1a in the container 1 to be conveyed and the container support pins 15 which abut thereagainst is lower than a force equivalent to the weight of the single members 11 and 12.

As described above, the container gripping means 2A and 2B and the positioning members 3a to 4b are lowered to the lowering limit height so as to lower the container 1 to be conveyed to an intended place, then the container gripping means 2A and 2B are moved away from each other in the horizontally lateral direction, the positioning members 3a to 4b are moved horizontally away from the four corners of the container 1 to be conveyed such that the gripping action on the container 1 to be conveyed is cancelled and thereafter the container gripping means 2A and 2B and the positioning members 3a to 4b are raised to the original standby height, with the result that a series of container lowering steps are completed. When in the process of the container lowering steps, as described above, the container gripping means 2A and 2B are moved away from each other in the horizontally lateral direction, and thus the container support pins 15 of the respective single members 11 and 12 are released in the horizontally lateral direction from a region which overlaps, in plan view, the overhanging rib 1a in the container 1 to be conveyed, as described above, the pressing force between the upper surface or the lower surface of the overhanging rib 1a and the container support pins 15 which abut thereagainst is zero or small. Therefore, the pull-out resistance of the container support pins 15 abutting against the upper surface or the lower surface of the overhanging rib 1a is small, and even when the container 1 to be conveyed is one container which is empty and which is not stacked, the possibility that the container 1 to be conveyed is dragged laterally as the container support pins 15 are pulled out is eliminated.

A raising/lowering conveyance device for a container for conveying an article according to the present invention can be utilized as a device which is able to, in a storage facility in which a container for conveying an article that is small enough to be able to be lifted with both hands is directly placed on a flat surface, sandwich both sides of the container with container gripping means and thereby can lift and convey the container.

The invention claimed is:

1. A raising/lowering conveyance device for a container for conveying an article, the raising/lowering conveyance device comprising:
    at least two container gripping devices, each container gripping device being capable of moving close to and away from the container for conveying an article in a horizontal direction, and being operable to be raised and lowered,
    each container gripping device including a pinholder-shaped structure having multiple container support pins, wherein each container support pin is capable of protruding and retracting in the horizontal direction on a side of the container and is biased and held in a protrusion position,
    the container support pins being operable to enter a lower side of a downward facing step surface formed on an outside of the container, by movement toward the container, and the container support pins being operable to support the container,
    each container gripping device being supported by a columnar support member for raising and lowering the container gripping device,
    an elastic material being disposed between each columnar support member and the associated container gripping device, and the elastic material being operable to bias the associated container gripping device in a raising direction,
    each container gripping device being held, by an upward biasing force of the elastic material, at an equilibrium height in equilibrium with a weight of the container gripping device so as to be able to be moved vertically with the equilibrium height serving as a center of the movement, and
    the container gripping devices being operable to lift the container and when the container gripping devices lift the container, the container gripping devices are supported by the columnar support members in a position in a state of being lowered from the equilibrium height, in response to a weight of the container.

2. The raising/lowering conveyance device for a container for conveying an article according to claim 1, wherein
    in the columnar support members, spring bearing members are provided in a position below the container gripping devices, and
    the elastic material comprises a plurality of compression coil springs for supporting the container gripping devices at upper ends of the compression coil springs, and the compression coil springs are attached to the spring bearing members.

3. The raising/lowering conveyance device for a container for conveying an article according to claim 2, wherein
    stoppers are provided which receive the container gripping devices that are lowered from the equilibrium height, and the stoppers being operable to receive the container gripping devices in a position higher than a height of upper ends of the compression coil springs at a state of maximum compression of the compression coil springs.

4. The raising/lowering conveyance device for a container for conveying an article according to claim 2, wherein
    the compression coil springs are formed in a shape of a cone in which an upper end for supporting the container gripping devices has a minimum diameter.

* * * * *